(12) United States Patent
Munir et al.

(10) Patent No.: US 11,367,041 B2
(45) Date of Patent: Jun. 21, 2022

(54) OCCUPANCY SENSING SYSTEM FOR CUSTODIAL SERVICES MANAGEMENT

(71) Applicant: Robert Bosch GmbH, Stuttgart (DE)

(72) Inventors: Sirajum Munir, Pittsburgh, PA (US); Charles P. Shelton, Monroeville, PA (US)

(73) Assignee: Robert Bosch GmbH, Stuttgart (DE)

( * ) Notice: Subject to any disclaimer, the term of this patent is extended or adjusted under 35 U.S.C. 154(b) by 3 days.

(21) Appl. No.: 16/148,206

(22) Filed: Oct. 1, 2018

(65) Prior Publication Data

US 2019/0392377 A1 Dec. 26, 2019

Related U.S. Application Data

(60) Provisional application No. 62/689,484, filed on Jun. 25, 2018.

(51) Int. Cl.
*G06Q 10/08* (2012.01)
*G06Q 10/06* (2012.01)

(52) U.S. Cl.
CPC ..... *G06Q 10/087* (2013.01); *G06Q 10/06312* (2013.01)

(58) Field of Classification Search
None
See application file for complete search history.

(56) References Cited

U.S. PATENT DOCUMENTS

| | | | | |
|---|---|---|---|---|
| 8,970,391 B2* | 3/2015 | Hoekstra | ............... | G06Q 10/00 340/870.01 |
| 10,028,147 B1* | 7/2018 | Coney | ................... | H04W 4/021 |
| 10,657,746 B1* | 5/2020 | Munir | ............... | G06K 9/00778 |
| 2004/0117330 A1* | 6/2004 | Ehlers | .................. | H04L 67/125 705/412 |
| 2006/0175403 A1* | 8/2006 | Fossen McConnell | | ...................... G06Q 30/02 235/385 |
| 2009/0119142 A1* | 5/2009 | Yenni | ..................... | H04L 67/12 705/7.15 |
| 2010/0025483 A1* | 2/2010 | Hoeynck | ................... | H02J 3/14 236/1 C |
| 2014/0079282 A1* | 3/2014 | Marcheselli | ............. | G06T 7/73 382/103 |
| 2014/0277757 A1* | 9/2014 | Wang | ..................... | F24F 11/30 700/276 |
| 2015/0073925 A1* | 3/2015 | Renfroe | ................ | G06Q 50/12 705/15 |
| 2015/0345942 A1* | 12/2015 | Allocco | ............ | G06Q 30/0255 382/103 |

(Continued)

*Primary Examiner* — Sujay Koneru
(74) *Attorney, Agent, or Firm* — Maginot, Moore & Beck LLP

(57) ABSTRACT

An occupancy sensing based system for custodial service management is disclosed that allows schedule custodial services based on actual usage of a site, such as a restroom, instead of following a static schedule and hence can potentially save a significant amount of labor cost. The system is very accurate, privacy aware, and easy to use. In addition to allowing custodial management to optimize their workforce, the system is capable of detecting theft of supplies and performing inventory management. It can be useful in airports, hospitals, stadiums, theaters, academic buildings, convention centers, and many other dynamic places.

18 Claims, 7 Drawing Sheets

(56) References Cited

U.S. PATENT DOCUMENTS

| | | | |
|---|---|---|---|
| 2016/0110786 A1* | 4/2016 | Herring | G06K 9/00536 |
| | | | 705/26.35 |
| 2017/0039515 A1* | 2/2017 | Wilkinson | G06Q 10/0833 |
| 2017/0293846 A1* | 10/2017 | Zyglowicz | G06K 9/00335 |
| 2017/0327344 A1* | 11/2017 | Richmond | B66B 5/0012 |
| 2017/0344957 A1* | 11/2017 | Ophardt | G06Q 10/1097 |
| 2018/0029840 A1* | 2/2018 | Wang | B66B 25/003 |
| 2018/0113897 A1* | 4/2018 | Donlan | G06F 16/248 |
| 2018/0114168 A1* | 4/2018 | Ryan | G06Q 10/08 |
| 2018/0144290 A1* | 5/2018 | Alvo | G06Q 10/087 |
| 2018/0225585 A1* | 8/2018 | Dong | G06F 17/16 |
| 2019/0043002 A1* | 2/2019 | King | G06F 9/541 |
| 2019/0043281 A1* | 2/2019 | Aman | G07C 9/00896 |
| 2019/0160195 A1* | 5/2019 | Kelsen | A61L 9/012 |
| 2019/0172165 A1* | 6/2019 | Verteletskyi | G01C 21/206 |
| 2019/0236376 A1* | 8/2019 | Sakashita | G07C 9/27 |
| 2019/0279024 A1* | 9/2019 | Martinello | G06K 9/4671 |
| 2019/0285747 A1* | 9/2019 | Yakymyshyn | G01S 17/86 |
| 2019/0335957 A1* | 11/2019 | Hines | B67D 3/0093 |
| 2019/0346588 A1* | 11/2019 | Hsu | B66B 25/003 |
| 2019/0352889 A1* | 11/2019 | Mock | B05B 12/14 |
| 2019/0392378 A1* | 12/2019 | Alvo | G06Q 10/087 |

* cited by examiner

OCCUPANCY SENSING SYSTEM FOR CUSTODIAL SERVICES MANAGEMENT

This application claims the benefit of priority of U.S. provisional application Ser. No. 62/689,484, filed on Jun. 25, 2018 the disclosure of which is herein incorporated by reference in its entirety.

FIELD

The device and method disclosed in this document relates to occupancy sensing and, more particularly, to an occupancy sensing system for custodial services management.

BACKGROUND

Unless otherwise indicated herein, the materials described in this section are not prior art to the claims in this application and are not admitted to the prior art by inclusion in this section.

Custodial service provides the cleaning services in buildings. It is expensive and has a multi-million-dollar market in airports, hospitals, stadiums, theaters, academic buildings, and convention centers. Current custodial services are typically based on static schedules and do not monitor or take into account the number of people using the facility in real-time. Accordingly, some restrooms which are heavily used may be under-serviced by custodial staff and restrooms are only rarely used may be over-serviced by custodial staff, leading to inefficient workforce management and increased costs.

SUMMARY

An occupancy sensing system is disclosed. The occupancy sensing system comprises: a plurality of occupancy sensors, each occupancy sensor being installed at an entryway to a respective site of a plurality of sites, each occupancy sensor having a depth sensor that faces the entryway to the respective site and is configured to provide depth sensor data, each occupancy sensor being configured to (i) determine a flow of people through the entryway to the respective site based on the depth sensor data and (ii) determine a number of people occupying the respective site at a plurality of different times based on the determined flow of people through the entryway to the respective site; and a server communicatively coupled to the plurality of occupancy sensors and configured to receive data from the plurality of occupancy sensors indicating the number of people occupying each of the plurality of sites at the plurality of different times.

BRIEF DESCRIPTION OF THE DRAWINGS

The foregoing aspects and other features of the occupancy sensing system are explained in the following description, taken in connection with the accompanying drawings.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In this disclosure, an occupancy sensing system for custodial services management is described. As used herein, "custodial services" includes, but is not limited to, cleaning, resupplying, repairing, inspecting, or otherwise maintaining a public, semi-public, and/or private site, such as a restroom, communal area, cafeteria, or other site which needs to be maintained. The occupancy sensing based custodial services management system may be particularly useful in places where the occupancy pattern is irregular and dynamic, such as airports, hospitals, stadiums, theaters, academic buildings, and convention centers. In such places, there is a huge potential savings in labor cost by optimizing work schedules based on actual usage of the facilities. In addition, the occupancy sensing based custodial services management system is also useful for inventory management and theft detection.

Although an occupancy sensing based custodial services management system is useful for a variety of purposes, one particular problem addressed and discussed in detail herein is to monitor actual usage of restrooms in real-time and to make that information available to the custodial services management. More specifically, the system counts a number of people coming in and going out from each restroom area in real-time and determines how the restroom is used. It will be appreciated however, that the system is similarly applicable to other purposes.

There are several challenges in counting number of people using restrooms. Particularly, placing sensors inside a restroom is generally discouraged. Additionally, the solution should be non-privacy invasive, which prevents using sensors such as an RGB camera. Furthermore, it is challenging to determine how individuals use the restroom, i.e. how long did they spend in the restroom and what restroom supplies did they use.

Figure 1:
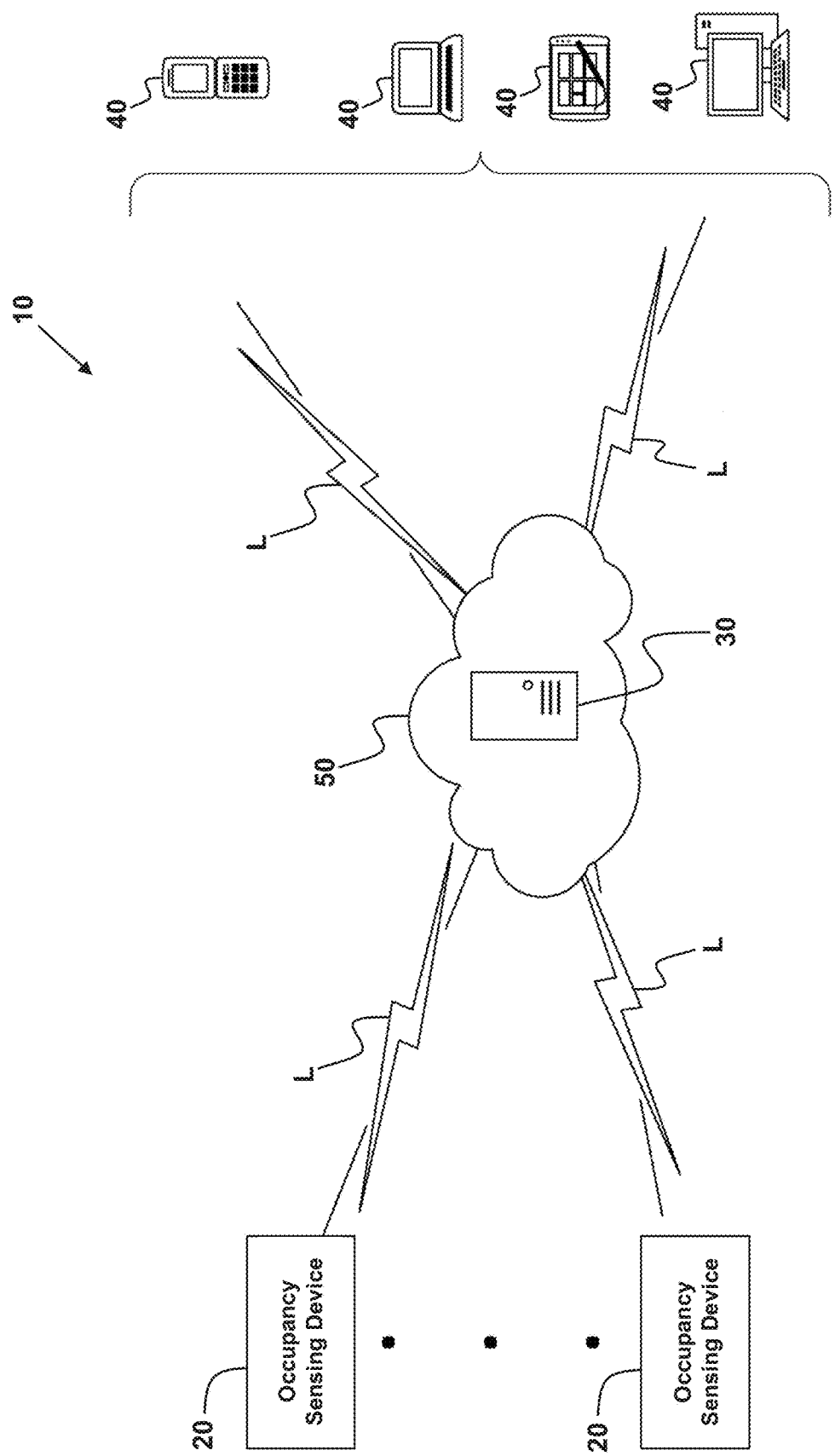
FIG. 1 is a diagrammatic view of an exemplary embodiment of an occupancy sensing system.
Figure 2:
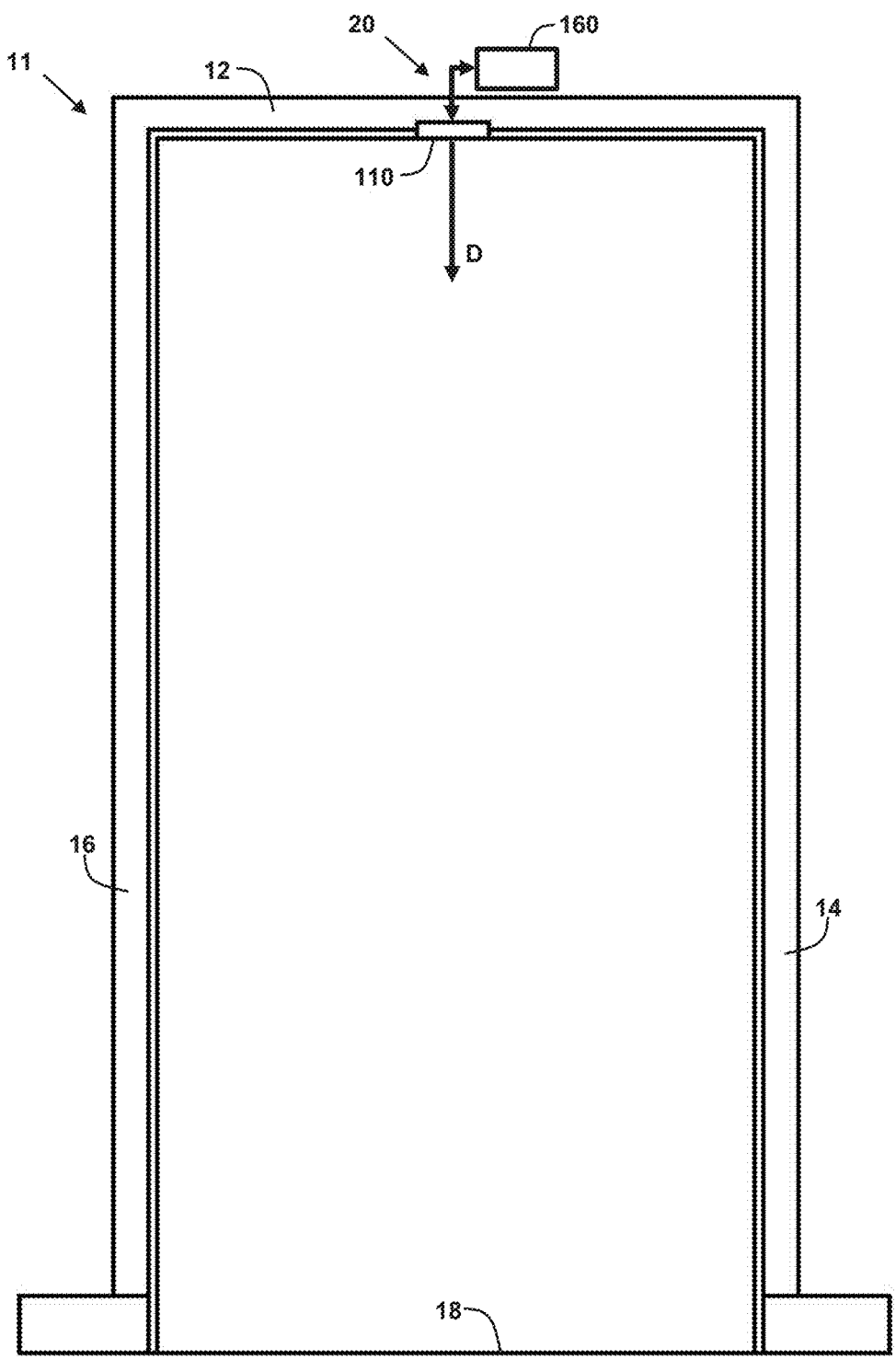
FIG. 2 is a diagrammatic view of an exemplary installation of an occupancy sensing device at an entryway of a site.

With reference to FIGS. 1-2, an exemplary embodiment of a custodial services management system 10 is described. As shown in FIG. 1, the custodial services management system 10 includes a plurality of occupancy sensing devices 20. The occupancy sensing devices 20 are configured to monitor the occupancy and usage of one or more sites, in particular one or more restrooms of a building. In some embodiments, occupancy sensing devices 20 are configured to track how many people have used a corresponding site and how long each person used the corresponding site.

The custodial services management system 10 further includes a server 30. The server 30 is configured to collect and process occupancy and usage information provided by the occupancy sensing devices 20 in order to provide various custodial services management functions, such as estimating a consumption and/or depletion of supplies for the site (e.g., toilet papers, soaps, and paper towels, in the case of a restroom), determining whether a particular site needs to be serviced, and generating optimized service schedules for the sites and for custodial service workers. The server 30 may be an application server, a certificate server, a mobile information server, an e-commerce server, a FTP server, a directory server, CMS server, a printer server, a management server, a mail server, a public/private access server, a real-time communication server, a database server, a proxy server, a streaming media server, or the like.

The custodial services management system 10 further includes one or more client devices 40. The client devices 40 enable users, such as custodial service workers, to view information regarding the occupancy and usage of the site, the estimations of supplies for particular sites, which sites need to be serviced, and the generated services schedules. Each client device 40 may be a personal computer or desktop computer, a laptop, a cellular or smart phone, a tablet, a personal digital assistant (PDA), a wearable device, a gaming console, an audio device, a video device, an entertainment device such as a television, a vehicle infotainment, or the like.

The occupancy sensing devices 20, the server 30, and the client devices 40 are configured to communicate with one another via communication links L of a network 50. The communication links L may be wired, wireless, or combination thereof. The network 50 can comprise one or more sub-networks that work in concert to enable communication between the occupancy sensing devices 20, the server 30, and the client devices 40. The network 50 may comprise, in part, a pre-existing network such as enterprise-wide computer networks, intranets, internets, public computer networks, or any combination thereof. The network 50 may include for example a local-area network (LAN), a metropolitan area network (MAN), a wide area network (WAN), a primary public network with a private sub-network, a primary private network with a public sub-network, or a primary private network with a private sub-network 50. Still further embodiments of the network 50 may include network types such as a point to point network, a broadcast network, a telecommunication network, a data communication network, a computer network, an ATM (Asynchronous Transfer Mode) network, a SONET (Synchronous Optical Network) network, a SDH (Synchronous Digital Hierarchy) network, a wireless network, a wireline network, and the like. The particular network topology of the network 50 can differ within different embodiments which may include a bus network topology, a star network topology, a ring network topology, a repeater-based network topology, or a tiered-star network topology. Additional embodiments of the network 50 may utilize mobile telephone networks that use a protocol to communicate among mobile devices, where the protocol can be for example AMPS, TDMA, CDMA, GSM, GPRS, UMTS, LTE or any other protocol able to transmit data among mobile devices. A wireless communication link may include cellular protocol, data packet protocol, radio frequency protocol, satellite band, infrared channel, or any other protocol able to transmit data among devices of the network 50.

With reference to FIG. 2, an exemplary installation of an occupancy sensing device 20 at an entryway 11 of a site is shown. In at least one embodiment, the site is a restroom, but may also comprise any room of a building, a convention center, an airport, an auditorium, a theatre, a place, a space regardless open or closed, any commonplaces, any private access places or locations, or the like. In the illustrated installation, an occupancy sensing device 20 and/or a depth sensor 110 thereof, is mounted to and/or integrated with a top section 12 of the entryway 11. The occupancy sensing device 20 is mounted to and/or integrated with the entryway 11 such that the depth sensor 110 faces a direction that is orthogonal to the inner portion or frame of the entryway 11. For example, in the illustrated embodiment, the depth sensor 110 faces a direction D toward a floor 18. However, the occupancy sensing device 20 has robust performance even if the depth sensor 110 is mounted an off-orthogonal angle due to a mounting error or mounting constraints because it can still sense people in the frame when mounted at an off-orthogonal angle. It will be appreciated that, in alternative embodiments, the occupancy sensing device 20 and/or the depth sensor 110 thereof can be mounted to and/or integrated with one of the side sections 14 or 16 of the entryway 11 or the floor 18 of the entryway 11, depending on the methods used for tracking people flow though the entryway 11.

In some embodiments, a display 160 of the occupancy sensing device 20 is mounted above the entryway and configured to display occupancy and/or usage information regarding the site. For example, in some embodiments, the display 160 is configured to display a number of people who currently occupy the site.

Each occupancy sensing device 20 is associated with a particular site, such as a particular restroom of a building, and is configured to monitor the occupancy and usage of the particular site. The occupancy sensing device 20 associated with the particular site is communicatively coupled to the server 30 via a communication link L of the network 50. In the case that a particular site includes multiple entryways, an occupancy sensing device 20 may be installed at each entryway. Alternatively, a single occupancy sensing device 20 associated with the site may include a respective depth sensor 110 installed at each entryway. The occupancy sensing devices 20 and/or depth sensors 110 thereof work together to monitor the occupancy and usage of the particular site having multiple entry ways.

It will be appreciated that the usage of the depth sensors 110 installed in the entry way is a much less privacy intrusive strategy for occupancy sensing than many other solutions for occupancy sensing. Particularly, the depth sensors 110 only measure distances from the sensor to the nearest object. Hence, the occupancy sensing device 20 can see the shape of a human body but, unlike RGB camera based solutions, does not see the face, color of the clothes or hair, or other more uniquely identifying features of particular people occupying the site. Additionally, as will be discussed in more detail below, only metadata such as an occupancy count is uploaded to the server 30. Thus, the solution is less privacy invasive because no images are stored or uploaded to the server 30. Furthermore, if the occupancy sensing devices 20 are compromised by a malicious actor, only depth sensor data and occupancy and/or usage metadata would be compromised.

Figure 3:
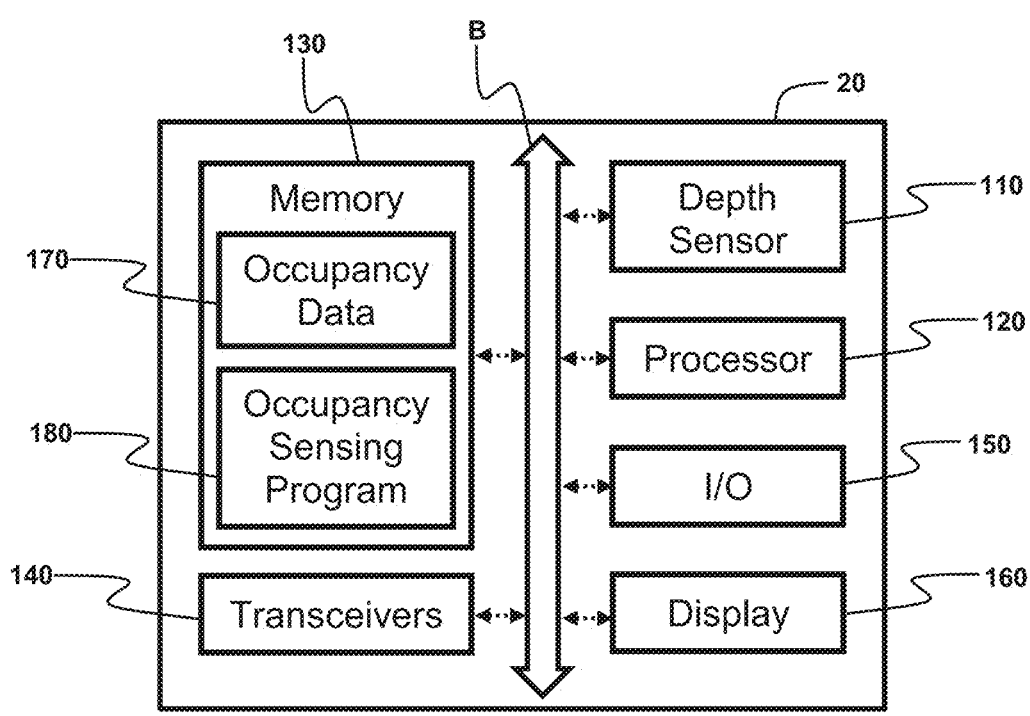
FIG. 3 is a block diagram of exemplary components of the occupancy sensing device(s) of FIGS. 1-2.

FIG. 3 illustrates a block diagram showing exemplary components of an occupancy sensing device 20 of FIGS. 1-2. In the illustrated embodiment, the occupancy sensing device 20 includes a depth sensor 110, a processor 120, a memory 130, one or more transceivers 140, an input/output (I/O) interface 150, and a display 160, which are communicatively coupled to one another via one or more system buses B. The system buses B may be any types of bus structures including a memory or a memory controller, a peripheral bus, a local bus, and any type of bus architectures. In at least one embodiment, the occupancy sensing device 20 further includes a battery (not shown) configured to provide power to the other components of the occupancy sensing device 20.

The depth sensor 110 is configured to provide depth data that is used by the processor 120 to detect and track a flow of people going in and coming out through the entryway 11 in real-time at the site. Although one depth sensor 110 is illustrated, an occupancy sensing device 20 may include more than one depth sensor 110. The depth sensor 110 may comprise an array of individual depth sensor elements (not shown) arranged in a grid, each configured to detect a depth value and provide sensor data representing the detected depth value. In one embodiment, the depth sensor 110 includes a readout controller (not shown) configured to control the individual depth sensor elements of the depth sensor 110, receive the sensor data from the individual depth sensor elements, and perform various pre-processing steps on the sensor data, such as digitizing the sensor data, timestamping the sensor data and/or packaging the sensor data into image frames at a predetermined or adjustable framerate. It will be appreciated, however, that such processing by the readout controller can alternatively be performed by the processor 120 of the occupancy sensing device 20.

In some embodiments, the occupancy sensing device 20 may further include other types of sensors such as optical sensors, imaging sensors, acoustic sensors, motion sensors, global positioning system sensors, thermal sensors, IR array sensors, and environmental sensors, which may be utilized in concert with the depth sensor 110, or in substitution thereof, to monitor the occupancy and usage of the site.

The processor 120 may be any of various processors as will be recognized by those of ordinary skill in the art. It will be recognized by those of ordinary skill in the art that a "processor" as used herein includes any hardware system, hardware mechanism or hardware component that processes data, signals, and/or other information. A processor can include a system with a central processing unit, multiple processing units, dedicated circuitry for achieving functionality, and/or other systems. Exemplary processors include microprocessors (µP), microcontrollers (µC), digital signal processors (DSP), or any combination thereof. The processor 120 may include one or more levels of caching, such as a level cache memory, one or more processor cores, and one or more registers. Example processor cores may include an arithmetic logic unit (ALU), a floating point unit (FPU), a digital signal processing core (DSP Core), or any combination thereof. In at least one embodiment, the processor 120 comprises a ARM processor. The processor 120 is operably connected to the depth sensor 110, the memory 130, the communication interface 140, the input/output interface 150, and the display 160 and is configured to receive the sensor data (pre-processed or otherwise) from the depth sensor 110.

The one or more transceivers 140 may be any of various devices configured for communication with other electronic devices, including the ability to send communication signals and receive communication signals. The transceivers 140 may include different types of transceivers configured to communicate with different networks and systems, at least including communication with the server via the communication links L of the network 50. The transceivers 140 may include, for example, a modem, a radio, a network interface, a communication port, a PCM-CIA slot and card, or the like. In one embodiment, the transceivers 140 are configured to exchange data using a protocol such as LoRa, Wi-Fi, Bluetooth, RFID, NFC, ZigBee, Z-Wave, or Ethernet.

The I/O interface 150 includes hardware and/or software configured to facilitate communications with the one or more peripherals and/or user interfaces, including the display 160, which may comprise an a LCD display, a 7-segment number display, one or more indicator lights, or the like. The input/output interface 150 is in communication with the display 160 and is configured to visually display graphics, text, and other data to users via the display 160. Additional peripherals and/or user interfaces may include a keyboard, joystick, a mouse, a trackball, a touch pad, a touch screen or tablet input, a foot control, a servo control, a game pad input, an infrared or laser pointer, a camera-based gestured input, and the like capable of controlling different aspects of the operation of the occupancy sensing device 20.

The memory 130 of the occupancy sensing device 20 is configured to store information, including both data and instructions. The memory 130 may be of any type of device capable of storing information accessible by the processor 120, such as a memory card, ROM, RAM, write-capable memories, read-only memories, hard drives, discs, flash memory, or any of various other computer-readable medium serving as data storage devices as will be recognized by those of ordinary skill in the art. In at least one embodiment, the memory 130 includes occupancy data 170, such as a data regarding a current or previous occupancy of the restroom, entry events or exit events through the entryway, and/or amounts of time particular individuals spent in the restroom. The data may further include various other operational data, logs, or the like, such as information regarding a last time the site was serviced by a custodial service worker, an estimated amount of supplies consumed and/or depleted since the last time the site was serviced, and/or an estimated amount of remaining supplies at the site.

The memory 130 is further configured to store program instructions that, when executed by the processor 120, enable the occupancy sensing device 20 to provide the features, functionality, characteristics and/or the like as described herein. Particularly, the memory 130 includes an occupancy sensing program 180 that enables monitoring of people flow through the entryway and the occupancy at the respective site.

In at least one embodiment, the processor 120 is configured to (i) determine a flow of people through the entryway to the respective site based on the depth sensor data and (ii) determine a number of people occupying the respective site at a plurality of different times based on the determined flow of people through the entryway to the respective site. Particularly, the processor 120 is configured to detect each time a person enters the site through the entryway and to detect each time a person exits the site through the entryway. Based on these detected entry events and exit events through the entryway, the processor 120 is configured to determine a number of people occupying the site by subtracting the number of exit events from the number of entry event events. In at least one embodiment, the processor 120 is configured to determine operate the display 160 to display occupancy information, such as the number of people occupying the respective site. In at least one embodiment, the processor 120 is configured to operate the transceivers 140 to transmit data to the server 30 including occupancy counts with associated timestamps and entry and exit events with associated timestamps. It will be appreciated that this monitoring of people flow through the entryway and the occupancy at the respective site can be performed using a variety of different methods, models, and/or algorithms. An exemplary method for monitoring of people flow through the entryway and the occupancy at the respective site is discussed in more detail below with respect to FIGS. 6-7.

In at least one embodiment, the processor 120 is configured to determine an occupancy time of each person who enters the respective site. Particularly, in one embodiment, in order to determine how long someone stayed in the site, as each person enters or exits through the entryway, the processor 120 is configured to extract biometric features with respect to the person based on the depth sensor data, including but not limited to height, shoulder size, and head radius. Additionally, as each person enters or exits through the entryway, the processor 120 is configured to record a timestamp in association with the particular entry event or exit event. When each person exits through the entryway, the processor 120 is configured to compare the extracted biometric features with previously extracted biometric features of persons previously entering the site. Based on the comparison, the processor 120 is configured to match the exit event with a previous entry event and compare the respective timestamps thereof to determine how long the person occupied the site, referred to herein as occupancy time. In at least one embodiment, the processor 120 is configured to operate the transceivers 140 to transmit data to the server 30 occupancy times for each person who enters and subsequently exits through the entry way.

Figure 4:
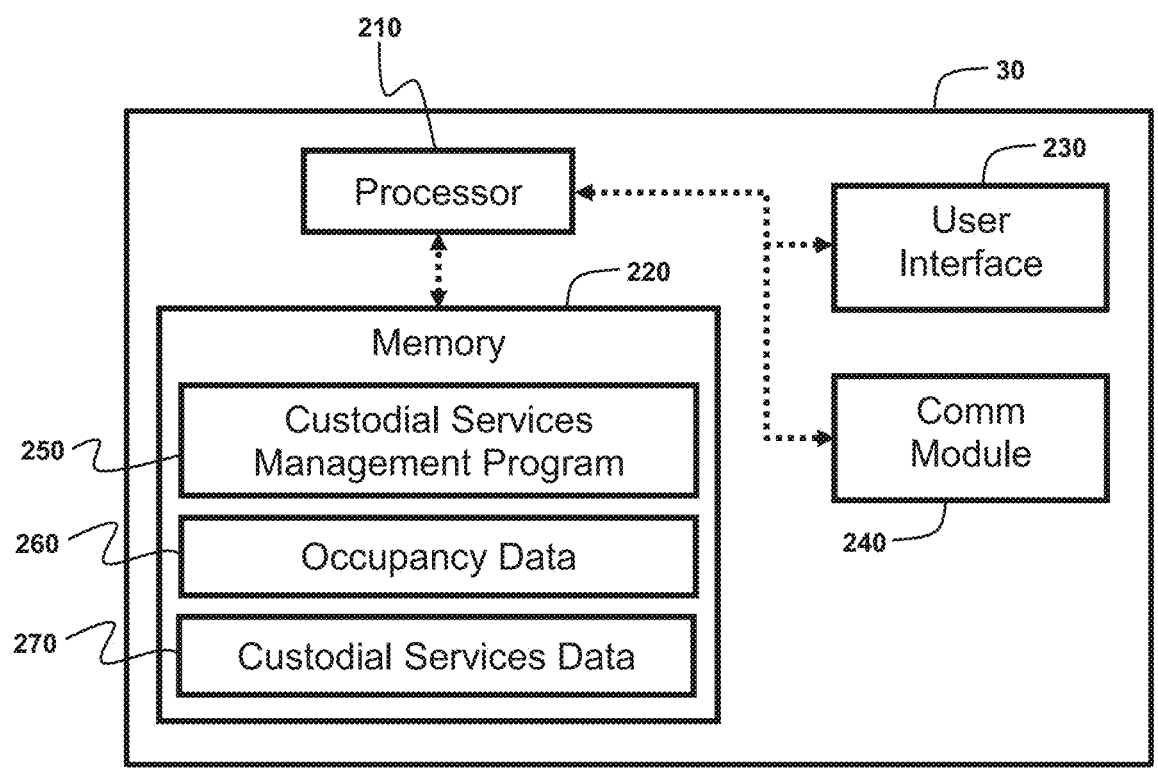
FIG. 4 is a block diagram of exemplary components of the server of FIG. 1.

FIG. 4 illustrates a block diagram showing exemplary components of the server 30 of FIGS. 1-2. In the illustrated embodiment, the server 30 includes a processor 210, memory 220, a user interface 230, and a network communications module 240. It is appreciated that the illustrated embodiment of the server 30 is only one exemplary embodiment of a server 30 and is merely representative of any of various manners or configurations of a server, remote computer, or any other data processing systems that are operative in the manner set forth herein.

The processor 210 may be any of various processors as will be recognized by those of ordinary skill in the art. It will be recognized by those of ordinary skill in the art that a "processor" as used herein includes any hardware system, hardware mechanism or hardware component that processes data, signals, and/or other information. A processor can include a system with a central processing unit, multiple processing units, dedicated circuitry for achieving functionality, and/or other systems. Exemplary processors include microprocessors (µP), microcontrollers (µC), digital signal processors (DSP), or any combination thereof. The processor 210 may include one or more levels of caching, such as a level cache memory, one or more processor cores, and one or more registers. Example processor cores may include an arithmetic logic unit (ALU), a floating point unit (FPU), a digital signal processing core (DSP Core), or any combination thereof. The processor 210 is operably connected to the memory 220, a user interface 230, and a network communications module 240.

The server 30 may be operated locally or remotely by a user. To facilitate local operation, the server 30 may include an interactive user interface 230. Via the user interface 230, a user may modify and/or update program instructions stored on the memory 220, as well as collect data from and store data to the memory 220. In one embodiment, the user interface 230 may suitably include an LCD display screen or the like, a mouse or other pointing device, a keyboard or other keypad, speakers, and a microphone, as will be recognized by those of ordinary skill in the art. Alternatively, in some embodiments, a user may operate the server 30 remotely from another computing device which is in communication therewith via the network communication module 240 and has an analogous user interface.

The network communication module 240 of the server 30 provides an interface that allows for communication with any of various devices or networks and at least includes transceivers or other hardware configured to communicate with the occupancy sensing devices 20 and with the client devices 40. In particular, the network communications module 240 may include a local area network port that allows for communication with any of various local computers housed in the same or nearby facility. In some embodiments, the network communications module 240 further includes a wide area network port that allows for communications with remote computers over the Internet. Alternatively, the server 30 communicates with the Internet via a separate modem and/or router of the local area network. In one embodiment, the network communications module 240 is equipped with a Wi-Fi transceiver or other wireless communications device. Accordingly, it will be appreciated that communications with the server 30 may occur via wired communications or via the wireless communications. Communications may be accomplished using any of various known communications protocols.

The memory 220 of the server 30 is configured to store information, including both data and instructions. The memory 220 may be of any type of device capable of storing information accessible by the processor 210, such as a memory card, ROM, RAM, write-capable memories, read-only memories, hard drives, discs, flash memory, or any of various other computer-readable medium serving as data storage devices as will be recognized by those of ordinary skill in the art. In at least one embodiment, the memory 220 includes occupancy data 260, such as a data received from the occupancy sensing devices 20 regarding a current or previous occupancy of the restroom, entry events or exit events through the entryway, and/or amounts of time particular individuals spent in the restroom. In at least one embodiment, the memory 220 includes custodial services data 270 which includes various other operational data, logs, or the like, such as information regarding a last time that each site was serviced by a custodial service worker, estimated amounts of supplies consumed and/or depleted since the last time each site was serviced, estimated supplies remaining at each site, service schedules for each site, and information regarding the custodial service workers and their work schedules.

The memory 220 is further configured to store program instructions that, when executed by the processor 210, enable the server 30 to provide the features, functionality, characteristics and/or the like as described herein. Particularly, the memory 220 includes a custodial services management program 250 that enables monitoring an occupancy of the plurality of sites at which the occupancy sensing devices 20 are installed, estimating a usage of supplies at the site, and managing the service of the sites by custodial service workers based on the occupancy and usage at the sites. Particularly, in at least one embodiment, in the case that the sites are restrooms, the custodial services management program 250 enables monitoring of the occupancy of the restrooms, estimating a usage of restroom supplies (e.g., toilet papers, soaps, and paper towels), and managing the service of the restrooms by custodial service workers.

Particularly, the server 30 is configured to receive from each of the occupancy sensing devices 20, via the communications module 240 or otherwise, occupancy and/or usage related metadata such as occupancy counts with associated timestamps, entry and exit events with associated timestamps, and occupancy times for each person who occupied one of the sites.

In some embodiments, based on the received occupancy and/or usage related metadata, the processor 210 is configured to, for each person who enters one of the sites, estimate a usage of supplies by the respective person at the respective site. Particularly, in at least one embodiment, the processor 210 is configured to estimate the usage of supplies by each person based on the occupancy time of the respective person at the respective site. In one embodiment, the processor 210 is configured to estimate the usage of supplies by each person based on a comparison of the occupancy time of the respective person with a one or more predetermined threshold durations T. Particularly, in one embodiment, the processor 210 is configured to estimate that a first amount of supplies were used by the respective person at the respective site in response to the occupancy time of the respective person being less than a predetermined threshold duration T. Similarly, the processor 210 is configured to estimate that a second amount of supplies were used by the respective person at the respective site in response to the occupancy time of the respective person being greater than the predetermined threshold duration T For example, in the case that the sites are restrooms, if a person spends less than a first predetermined threshold duration $T_1$ (e.g., 3 minutes) in the restroom, then the processor 210 is configure to determine that a first amount of restroom supplies (e.g., toilet papers, soaps, and paper towels) were used. Similarly, if a person spends more than the first predetermined threshold duration $T_1$ (e.g., 3 minutes) in the restroom, then the processor 210 is configure to determine that a second amount of restroom supplies were used. In at least one embodiment, the second amount is greater than the first amount. The first and second amounts of restroom supplies can be set in accordance with implicit assumptions about how the restroom was used by the person based on how long the person was in the restroom (i.e., a longer occupancy may suggest that more toilet paper is used). Additionally, in some embodiments, the first and second amounts of restroom supplies might be set differently depending on whether the restroom is a men's restroom or a women's restroom (i.e., a short occupancy in the men's restroom may suggest no toilet paper usage, whereas a short occupancy in the women's restroom may suggest a small amount of toilet paper usage). For some types of supplies, the first and second amount may be the same regardless of occupancy time (e.g., soap and paper towels). In some embodiments, the processor 210 is configured to adjust the estimated first and second amounts of restroom supplies over time based on actual usage reported by custodial service workers.

In some embodiments, multiple thresholds may be used. For example, in one embodiment, if a person spends more than a second predetermined threshold duration $T_2$ (e.g., 45 minutes) in the restroom, then the processor 210 is configure to determine that third amount of restroom supplies were used. If a person spends more than the first predetermined threshold duration $T_1$ (e.g., 3 minutes) but less than the second predetermined threshold duration $T_2$ (e.g., 45 minutes) in the restroom, then the processor 210 is configure to determine that the second amount of restroom supplies were used. In one embodiment, the third amount of restrooms supplies is smaller than the second amount, based on an assumption that the person may have made a phone call in the restroom or engaged in some other atypical usage of the restroom.

It will be appreciated, however, that in alternative embodiments, the processors 120 of the occupancy sensing devices 20 are configured to estimate the usage of supplies by each person who enters the respective site in the manners described above. In such embodiments, the processor 120 is configured to operate the transceivers 140 to transmit data to the server 30 including the estimated usage of supplies by each person who enters the site.

In some embodiments, the processor 210 is configured store, in the memory 220, a custodial service log indicating a service history of each site, at least including a most recent time at which each respective site was serviced by a custodial service worker. In at least one embodiment, the processor 210 is configured to estimate a total usage of supplies at each site in the plurality of sites since the most recent time at which each respective site was serviced. In one embodiment, the processor 210 is configured to determine the total usage of supplies at each site based on the number of people who have occupied each respective site since the most recent time at which each respective site was serviced. More particularly, in one embodiment, the processor 210 is configured to determine the total usage of supplies at each site based on the estimated usage of supplies by each person who entered the site since the most recent time at which each respective site was serviced.

It will be appreciated, however, that in alternative embodiments, the processors 120 of the occupancy sensing devices 20 are configured to store, in the memory 130, a most recent time at which the respective site was serviced by a custodial service worker and to estimate the total usage of supplies at the respective site in the manners described above. In such embodiments, the processor 120 is configured to operate the transceivers 140 to transmit data to the server 30 including the estimated total usage of supplies at the respective site.

In one embodiment, the processor 210 is configured to, for each of the plurality of sites, estimate an amount of remaining supplies at the respective site based on the estimated total usage of supplies at the respective site since the most recent time at which each respective site was serviced. Particularly, in one embodiment, the processor 210 is configured to estimate the amount of remaining supplies at the respective site by subtracting the total usage of supplies from a starting amount of supplies that were present after the most recent time at which each respective site was serviced.

In one embodiment, the processor 210 is configured to, for each of the plurality of sites, determine a next time at which the respective site shall next be serviced by a custodial service worker based on the estimated total usage of supplies at the respective site since the most recent time at which each respective site was serviced and/or based on the estimated remaining supplies at the respective site.

In some embodiments, the processor 210 is configured to determine a usage pattern for each of the plurality of sites based on the occupancy and/or usage related data received from the occupancy sensing devices 20. Based on the usage patterns, the processor 210 is configured to generate a service schedule for each of the plurality of sites based on the usage patterns. Additionally, the determined usage patterns can be used to identify theft activity when there is a deviation from a consumption of supplies expected based on the regular usage pattern. For example, if it is determined that no one used the restroom in a weekend, but a significant amount of supplies were replenished by the cleaners, it could be a sign of stealing restroom supplies.

Figure 5:
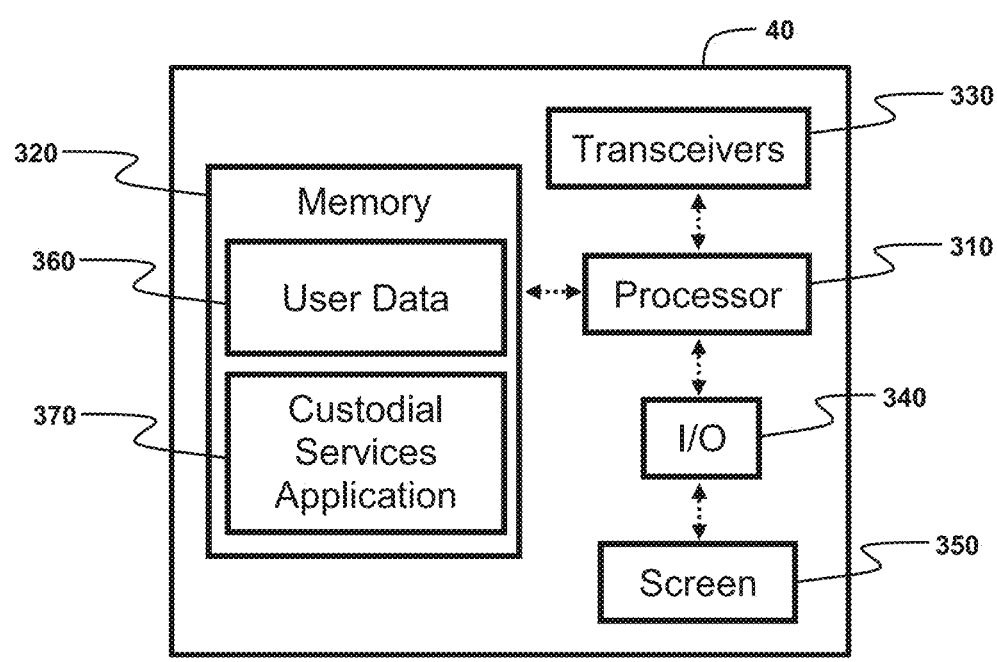
FIG. 5 is a block diagram of exemplary components of the client device(s) of FIG. 1.

FIG. 5 shows an exemplary embodiment of one of the client devices 40, which may comprise a smart phone, a smart watch, a laptop computer, a tablet computer, desktop computer, or the like. In the illustrated embodiment, the client device 40 comprises a processor 310, a memory 320, transceivers 330, an I/O interface 340, and a display screen 350. It is appreciated that the illustrated embodiment of the client device 40 is only one exemplary embodiment of a client device 40 and is merely representative of any of various manners or configurations of a client device, a personal electronic device, or other device that is operative in the manner set forth herein.

The processor 310 may be any of various processors as will be recognized by those of ordinary skill in the art. It will be recognized by those of ordinary skill in the art that a "processor" as used herein includes any hardware system, hardware mechanism or hardware component that processes data, signals, and/or other information. A processor can include a system with a central processing unit, multiple processing units, dedicated circuitry for achieving functionality, and/or other systems. Exemplary processors include microprocessors (μP), microcontrollers (μC), digital signal processors (DSP), or any combination thereof. The processor 310 may include one or more levels of caching, such as a level cache memory, one or more processor cores, and one or more registers. Example processor cores may include an arithmetic logic unit (ALU), a floating point unit (FPU), a digital signal processing core (DSP Core), or any combination thereof. The processor 310 is operably connected to the memory 320, the transceivers 330, the I/O interface 340, and the display screen 350.

The transceivers 330 at least includes a transceiver, such as a Wi-Fi transceiver, configured to communicate with the server 30 via the network 50, but may also include any of various other devices configured for communication with other electronic devices, including the ability to send communication signals and receive communication signals. In one embodiment, the transceivers 330 further include additional transceivers which are common to smart phones, smart watches, laptop computers, tablet computers, desktop computers, such as Bluetooth transceivers, Ethernet adapters, and transceivers configured to communicate via for wireless telephony networks.

The I/O interface 340 includes software and hardware configured to facilitate communications with the one or more interfaces of the client device 40 including the display screen 350, as well as other interfaces such as tactile buttons, switches, and/or toggles, microphones, speakers, and connection ports. The display screen 350 may be an LED screen or any of various other screens appropriate for a personal electronic device. The I/O interface 340 is in communication with the display screen 350 and is configured to visually display graphics, text, and other data to the user via the display screen 350.

The memory 320 of the server 30 is configured to store information, including both data and instructions. The memory 320 may be of any type of device capable of storing information accessible by the processor 310, such as a memory card, ROM, RAM, write-capable memories, read-only memories, hard drives, discs, flash memory, or any of various other computer-readable medium serving as data storage devices as will be recognized by those of ordinary skill in the art. In at least one embodiment, the memory 320 includes user data 360 which includes various types of information related to one or more users, in particular one or more custodial services workers. The user data 360 may include a user and/or employee profile, work schedules, and the like.

The memory 320 is further configured to store program instructions that, when executed by the processor 310, enable the client device 40 to provide the features, functionality, characteristics and/or the like as described herein. Particularly, the memory 320 includes a custodial services application 370 that enables a user, such as a custodial service worker, to interface with and access data from the server 30.

Particularly, in one embodiment, the processor 310 of the client device 40 is configured to operate the transceivers 330 to transmit an information request to the server 30, which may include a unique employee identification number or the like. In response to the information request, the processor 210 of the server 30 is configured to transmit data that the user is authorized to view back to the client device 40 via the network communications module 240. Particularly, in some embodiments, in response to an information request, the processor 210 is configured to transmit to the client device 40 data such as: the number of people occupying each of the plurality of sites at a current time or at previous times, the estimated amount of remaining supplies at each site, the most recent time at which each site was serviced by a custodial service worker, a next time at which each of the sites shall next be serviced, and/or a generated service schedule for one or more of the sites.

In at least one embodiment, the processor 310 of the client device 40 is configured to receive inputs from a user via the I/O interface 340 indicating that a particular site has been serviced by the user. In response to an input indicating that a particular site has been serviced, the processor 310 is configured to operate the transceivers 330 to transmit a message to the server 30 indicating that the site has been serviced, which may include a timestamp and an identifier for the particular site. In response to the message to the server 30 indicating that the site has been serviced, the processor 210 of the server 30 is configured to record the timestamp in the memory 220 as the most recent time at which the site has been serviced. In one embodiment, the processor 210 of the server 30 is configured to forward the message to the corresponding occupancy sensing device 20 at the site, the processor 120 of which is configured to record the timestamp in the memory 130.

In at least one embodiment, the processor 310 of the client device 40 is configured to receive inputs from a user via the I/O interface 340 indicating how many supplies were required to resupply a particular site and/or how many supplies were actually remaining at a site at the time of service. The processor 310 is configured to include this resupply information with the message to the server 30 indicating that the site has been serviced. The processor 210 of the server 30 is configured to use the resupply information to compare this resupply information with an expected value based on the estimated amount of supplies remaining at each site based on observed usage and occupancy. If there is a mismatch between the reported resupply information and the expected value, then there may have been a theft of supplies and the processor 210 is configured to generate an alert or otherwise flag the possible theft.

Figure 6:
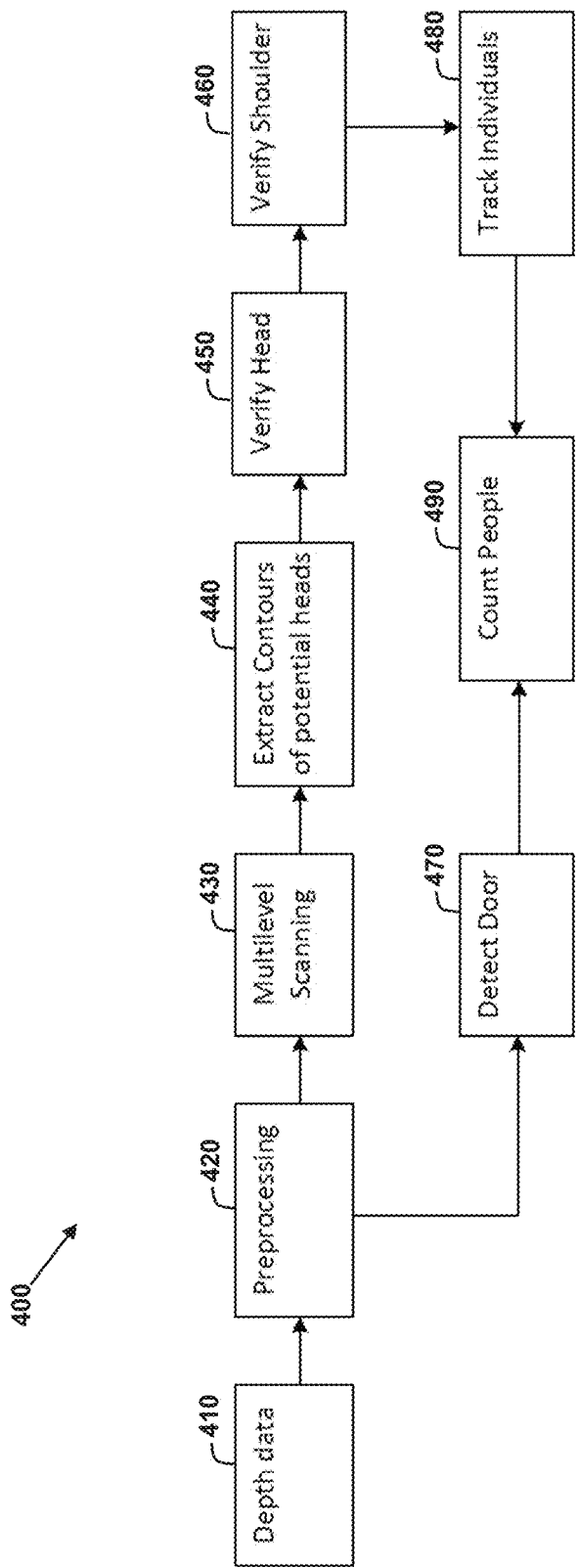
FIG. 6 shows a logical flow diagram for an exemplary method of operating an occupancy sensing device to monitor a people flow through an entryway and occupancy of a respective site.

FIG. 6 shows a logical flow diagram for an exemplary method 400 of operating an occupancy sensing device 20 to monitor a people flow through an entryway and occupancy of a respective site. In the description of the methods, statements that a method is performing some task or function refers to a controller or general purpose processor (e.g., the processor 120) executing programmed instructions (e.g. the occupancy sensing program 180) stored in non-transitory computer readable storage media (e.g., the memory 130) operatively connected to the controller or processor to manipulate data or to operate one or more components in the occupancy sensing device 20 to perform the task or function. Additionally, the steps of the methods may be performed in any feasible chronological order, regardless of the order shown in the figures or the order in which the steps are described.

In a step 410, the processor 120 receives depth sensor data from the depth sensor 110. As discussed above, the data provided by depth sensor 110 may be in the form of image frames. In particular, the processor 120 is configured to receive a chronological sequence of image frames, each including depth sensor data detected by the depth sensor 110 at a respective time. Each pixel of each depth image frame provides the distance from the depth sensor 110 to the nearest object. In one embodiment, the depth sensor 110 is configured to output image frames having a defined resolution (e.g., 512×424) and frame rate (e.g., 30 frames per second).

Figure 7:
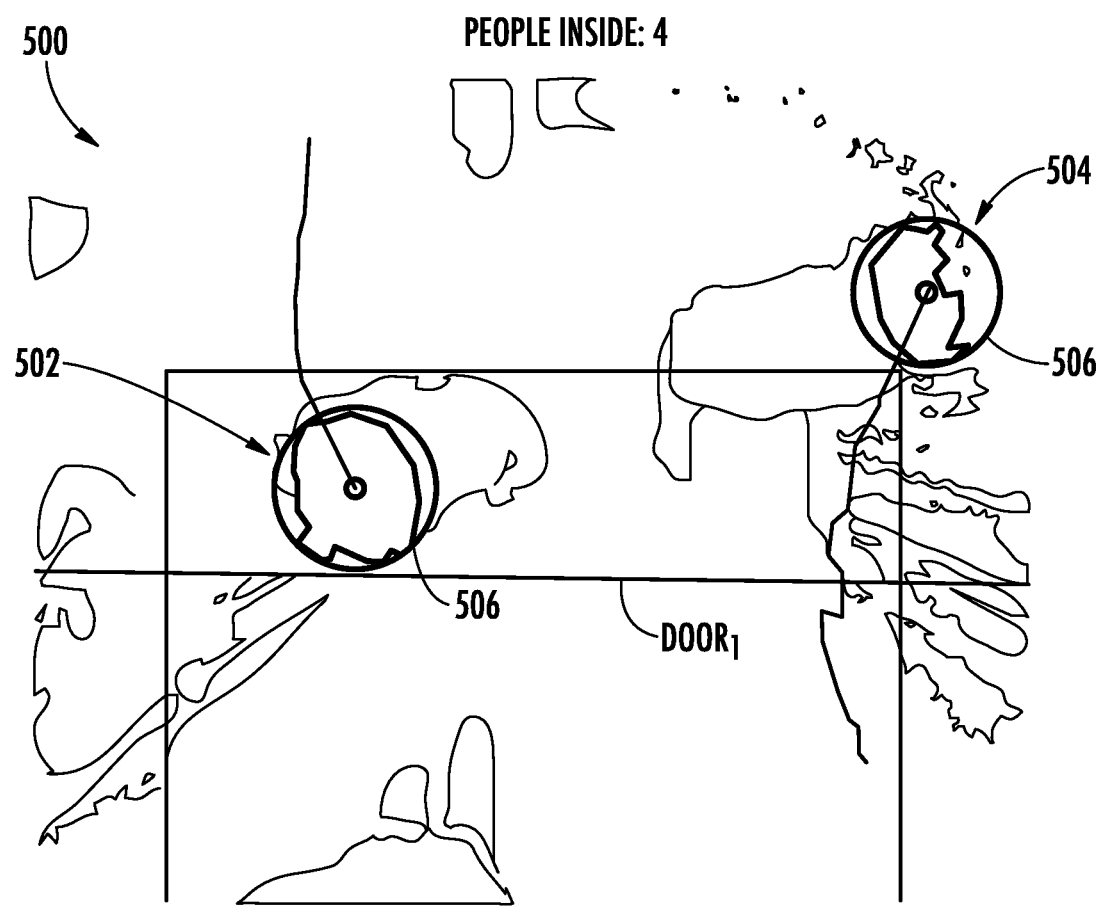
FIG. 7 shows an exemplary depth image frame.

In a step 420, the processor 120 is configured to pre-process the received depth sensor data. Particularly, in some embodiments, in the presence of noise, a corresponding pixel of a depth image frame may have a value of 0 or some other outlier value. Accordingly, in one embodiment, the processor 120 is configured to reset noise pixels and outliers (depth exceeding a predetermined threshold) to a depth of the floor 18. In one embodiment, the processor 120 is configured to compute the depth of the floor 18 by calculating a histogram of the depth values of a frame, where the bin with the maximum number of depth data points is considered the floor. Additionally, in some embodiments, the processor 120 is configured to apply median filtering to smooth each depth image frame. FIG. 7 shows an exemplary pre-processed depth image frame 500 have a person 502 entering through the entryway and a person 504 exiting through the doorway.

With continued reference to FIG. 6, in steps 430 and 440, the processor 120 is configured to perform multilevel scanning, in which multiple potential depth levels are scanned to detect humans and, for each scanned depth level, extract contours of potential human heads by ignoring the depth data below that level. Particularly, the goal of this step is to determine the centers and radii of minimum enclosing circles of all the potential heads. To this end, the processor 120 is configured to perform multilevel scanning, and determine the centers and radii of the heads by detecting contours at different height levels. In one embodiment, the processor 120 is configured to start scanning the depth sensor data from a first height (e.g., 6 feet from the floor) to a second height (e.g., 2 feet from the floor) at a predetermined interval (e.g., every 6 inches). It is noted that the average height of an adult male is about 5'7" to 5'11" and a female is about 5'2" to 5'7" and the starting height and ending height are chosen conservatively so that humans are not missed during multi-level scanning. When the processor 120 scans depth data at each height level, the processor 120 is configured to discard all the depth data below that height level. The processor 120 is configured to find all the contours at each depth level. For each contour, the processor 120 is configured to find a minimum enclosing circle (such as circles 506, shown in FIG. 7) using an iterative algorithm. The center and radius of the minimum enclosing circle is considered the center and radius of the head. As discussed below, for each detected center and radius, the processor 120 is configured to verify whether it is a person by verifying the presence of a head and a shoulder. However, a single person can be detected at different levels. In order to avoid this, the processor 120 is configured to scan from the top and when it verifies a person at a higher depth level, it discard all the nearby centers at lower levels.

In some embodiments, the processor 120 leverages two strategies to speed up processing. Firstly, when performing multilevel scanning, the processor 120 is configured to it is performed out of order. Instead of scanning from top (e.g., 6 feet from the floor) to bottom (2 feet from the floor) in a serial order, the processor 120 is configured to scan at the top most level first and then at the most bottom level, and then scan at the remaining levels. The intuition is that if there is someone there, the depth sensor 110 should capture a body at the bottom level scanning. If the bottom level scanning returns that there is nothing there compared to the approximate background (described below), the processor 120 is configured to move on to process the next depth image frame. Otherwise, the processor 120 is configured to scan the remaining levels in a serial order (top to bottom) to determine the precise location of the head. Secondly, the processor 120 is configured to not scan at the levels that do not have enough depth data compared to an approximate background. The processor 120 is configured to determine the approximate background by building a histogram of depth data points at different scanning levels (e.g., 6-inch bin sizes). Each time the processor 120 sees a new frame, the processor 120 is configured to update the histogram by assuming that the minimum number of depth data points seen so far at a level is from the background, which reasonably captures the wall, door, tables etc. in the environment. This approximate background detection technique enables the processor 120 to move on to the next frame quickly when there is no one in the scene.

In steps 450 and 460, the processor 120 is configured to verify whether each extracted contour represents a real person by verifying the presence of a head and a shoulder using anthropometric properties of a human body. Particularly, in the step 450, given a center ($c_x$, $c_y$) and a radius r of a head, the goal of this step is to verify if there is a human head at this position. The processor 120 is configured to use a hemi-ellipsoid (top half of an ellipsoid) to model a human head. Particularly, an ellipsoid in Cartesian coordinates is represented by the equation $$\frac{(x-c_x)^2}{a^2} + \frac{(y-c_x)^2}{b^2} + \frac{(z-c_x)^2}{c^2} = 1,$$

where a, b, and c are the lengths of the semi-axes and ($c_x$, $c_y$, $c_z$) is the center of the ellipsoid. The processor 120 is configured to set a=b=r (in pixel co-ordinate), and we set c=0.5*D (in depth co-ordinate), where D is the depth of a human head (e.g., 220 mm). The processor 120 is configured to $c_z$=T+0.5*D, where T is smallest distance between the depth sensor 110 and the head. The processor 120 is configured to iterate over the x, y values of the detected contours, compute a z value for each (x, y), and compare it with the corresponding z value in the depth frame. If the average difference is less than a threshold $T_{head}$, the processor 120 is configured to report that a head is detected.

In the step 460, given a center ($c_x$, $c_y$) and a radius r of a head, the goal of this step is to verify if there is a human shoulder close to this position. In order to verify a shoulder, the processor 120 is configured to perform four steps. First, the processor 120 is configured to consider a region of interest (ROI) surrounding the head and the shoulder. The end-to-end distance between the two shoulders of a person is around three times his head's diameter and hence the processor 120 is configured to choose a slightly bigger square ROI around the head. Second, the processor 120 is configured to extract the head from it by discarding all the depth data higher than T+D (computed in the head verification step). Third, the processor 120 is configured to subtract the head from the region of interest to obtain the shoulder depth data. Note that from the first step, the processor 120 is configured to discard all the depth data higher than T+D+S by setting these values to 0, where S is the depth of the shoulder. In one embodiment, the processor 120 is configured to set S to 250 mm, as ~10 inch depth is reasonable enough to capture a shoulder. Fourth, the processor 120 is configured to determine whether the obtained depth data conforms to a shoulder by trying several techniques. For example, in one embodiment, the processor 120 is configured to detect contours and measure a goodness of fit to an ellipse. In another embodiment, the processor 120 is configured to compute a histogram of depth data at different height levels and check if there is at least one bin at the shoulder depth level around the head's position that has enough depth data points to represent a shoulder. If there is no shoulder, e.g., for a ball, the depth data at that position will be close to the floor level and the bin at the shoulder level will not have enough depth data points. The purpose of the shoulder verification is to avoid spherical objects, e.g., balls, balloons, and spherical lamps. For counting people, the head verification usually suffices. However, shoulder size is a useful feature for identifying and tracking occupants.

In a step 470, the processor 120 is configured to determine the location of the door. Particularly, in one embodiment, the processor 120 is configured to determine the location of the door automatically, in six steps. First, starting with the preprocessed image, the processor 120 is configured to perform median filtering with kernel size 5. Second, the processor 120 is configured to discard the depth data that are very close to the ground (within 1 foot) and 2 feet above it by replacing these with the maximum floor depth. Third, the processor 120 is configured to detect Canny edges to increase contrast and reduce noise. Fourth, the processor 120 is configured to perform Hough line transformation on the Canny edges to detect straight lines. Even though Canny edge detection and Hough line transformations are not computationally cheap, it doesn't degrade the real-time performance as door detection is performed only at the beginning. Fifth, from the candidate Hough lines, the processor 120 is configured to choose the line (e.g., the line Door$_1$, as shown in FIG. 7) having the highest accumulator vote that is most parallel to the X axis of the depth frame.

In a step 480, the processor 120 is configured to track an individual people entering and exiting the entryway. The processor 120 performs two types of tracking: (i) basic tracking to determine whether people went inside or outside through a door to count them accurately and (ii) biometric tracking to identify and track individuals. The processor 120 is configured to implement a lightweight greedy bipartite matching algorithm by leveraging the position, height, and head radius of people. Assume that the processor 120 detects N and M people in the previous and current frames, respectively. For each pair of people (i,j), where i∈{1, 2, 3, ... N} and j∈{1, 2, 3, ... M}, the processor 120 is configured to normalize the distance between head centers, the difference of head radii and heights of each pair. Then the processor 120 is configured to compute a weighted distance by using these three distances (e.g., weight: 1, 1, and 0.5, respectively). The reason for a smaller weight for height difference is that we observe that the height of a person varies up to 40 millimeters when he or she walks from one side to the other. Then, the processor 120 is configured to sort the distances in ascending order and pair them in that order. If someone j∈{1, 2, 3, ... M} is not paired, the processor 120 is configured to add him in the current frame. However, if someone i∈{1, 2, 3, ... N} is not paired, the processor 120 is configured to do not immediately discard him, because, it is possible that the depth sensor 110 may miss someone in a frame and detect him in the next frame. For the missing person, the processor 120 is configured to predict the person's current position based on his average walking speed and direction, and update the location of the center of his head accordingly. To do so, every time there is a pair, the processor 120 is configured to update average walking speed and direction of the person.

At low frame rates, someone can move a considerable distance between consecutive frames, which impacts tracking negatively, e.g., when someone (P1) leaves through a door and someone else (P2) enters from the other side of the door in the next frame. It may look like P1 has moved towards his opposite direction and may increase/decrease the occupancy count erroneously. As the head of P1 is missing at the current frame, the greedy bipartite matching tries to match the earlier frame's P1 with the current frame's P2. To avoid this, the processor 120 is configured to consider the walking direction and if the matching requires a reversal of direction, the processor 120 is configured to check if there is a presence of a depth shadow of P1 in the current and previous frames at his respective predicted positions. As used herein depth shadow means a head is missing, but a partial body contour is seen near to that location. If a depth shadow is present, the processor 120 is configured to assume that P1 is/was there while P2 enters and we do not allow the matching.

Every time someone enters/exits through the entryway, the processor 120 is configured to extract a plurality of simple features regarding height, head radius, shoulder size, going in/coming out, and walking speed of the subject. More specifically, for height, the processor 120 is configured to extract several features including the minimum, maximum, average, and exact height from the depth data when s/he is crossing Door$_1$, and overall minimum, maximum, average, and median height during the entrance/exit event. Similar features are extracted regarding the head radius and shoulder size. The processor 120 is configured to match these features to identify individuals.

In a step 490, the processor 120 is configured to determine a count of people who currently occupy the site. Particularly, for each frame, for each person within that frame, the processor 120 is configured to determine $D_i$, which is 1 if he is outside of Door1 and 0 otherwise, where i∈{1,2}. The processor 120 is configured to increase the occupancy count if someone's $D_i$ is changed from 1 (at the previous frame) to 0 (at the current frame). The processor 120 is configured to note the direction of the person and if his $D_j$ (j≠i) is changed from 1 to 0 later, the processor 120 is configured to not increase the count again. However, if either $D_i$ or $D_j$ is changed from 0 to 1 later, the processor 120 is configured to decrease the occupancy count and ignore a similar change (0 to 1) subsequently.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An occupancy sensing system comprising:
    a plurality of occupancy sensing devices, each occupancy sensing device being installed at a respective site of a plurality of sites, each occupancy sensing device having at least one depth sensor that faces at least one respective entryway to the respective site and is configured to provide depth sensor data, each occupancy sensing device being configured to (i) as each respective person enters and exits through the at least one respective entryway to the respective site, perform a multi-level scanning process to extract depth contours of a body of the respective person and determine a height, head radius, and shoulder size of the respective person based on the extracted depth contours, and (ii) determine an occupancy duration of each person who enters the respective site by matching an entry event of the respective person with an exit event of the respective person based on a comparison of the determined height, head radius, and shoulder size of the entry event and the exit event; and
    a server communicatively coupled to the plurality of occupancy sensing devices and configured to receive data from the plurality of occupancy sensing devices,
    wherein one of (i) the server and (ii) each of the plurality of occupancy sensing devices is configured to, for each person who enters one of the plurality of sites, estimate a usage of supplies by the respective person at the respective site based on the occupancy duration of the respective person,
    wherein each occupancy sensing device in the plurality of occupancy sensing devices is further configured to, as each respective person enters and exits through the at least one respective entryway to the respective site, (i) verify that the extracted depth contours include a human head by comparing the extracted depth contours with an ellipsoid and (ii) verify that the extracted depth contours include a human shoulder by discarding the extracted depth contours corresponding to the head and checking whether remaining extracted depth contours conform to a shoulder shape, and
    wherein at least one site of the plurality of sites is a restroom and the supplies at the restroom include at least one of toilet paper, soap, and paper towels.

2. The occupancy sensing system of claim 1, wherein the server is configured to, for each person who enters one of the plurality of sites, (i) estimate that a first amount of supplies were used by the respective person at the respective site in response to the occupancy duration of the respective person being less than a predetermined threshold duration and (ii) estimate that a second amount of supplies were used by the respective person at the respective site in response to the occupancy duration of the respective person being greater than the predetermined threshold duration.

3. The occupancy sensing system of claim 1, wherein the server is configured to, for each of the plurality of sites, store in a memory a most recent time at which the respective site was serviced by a custodial service worker.

4. The occupancy sensing system of claim 3, wherein the server is configured to, for each of the plurality of sites, determine a next time at which the respective site shall next be serviced by a custodial service worker based on an estimated total usage of supplies at the respective site since the most recent time.

5. The occupancy sensing system of claim 3, wherein the server is configured to estimate a total usage of supplies at each site in the plurality of sites since the most recent time based on a number of people occupying each of the plurality of sites at the plurality of different times.

6. The occupancy sensing system of claim 3, wherein the server is configured to, for each of the plurality of sites, store in the memory an amount of supplies at the site at the most recent time at which the respective site was serviced by a custodial service worker.

7. The occupancy sensing system of claim 6, wherein the server is configured to, for each of the plurality of sites, estimate an amount of remaining supplies at the respective site based on the estimated usage of supplies at the respective site since the most recent time and the amount of supplies at the site at the most recent time.

8. The occupancy sensing system of claim 3, wherein the server is configured to receive, from a personal electronic device communicatively coupled to the server, data indicating the most recent time at which a particular site in the plurality of sites was serviced by a custodial service worker.

9. The occupancy sensing system of claim 8, wherein the server is configured to receive, from the personal electronic device, data indicating an actual amount of supplies that were replenished during the most recent time at which the particular site in the plurality of sites was serviced by a custodial service worker.

10. The occupancy sensing system of claim 9, wherein the server is configured to:
    determine an expected amount of supplies needed to replenish supplies at the particular site in the plurality of sites;
    compare the expected amount of supplies needed with the actual amount of supplies that were replenished; and
    detecting a theft of supplies based on the comparison.

11. The occupancy sensing system of claim 1, wherein the server is configured to (i) determine a usage pattern for each of the plurality of sites based on a number of people occupying each of the plurality of sites at the plurality of different times and (ii) generate a service schedule for each of the plurality of sites based on the respective usage pattern for each of the plurality of sites.

12. The occupancy sensing system of claim 1, wherein the server is configured to transmit, to a personal electronic device communicatively coupled to the server, data indicating a number of people occupying each of the plurality of sites at a current time.

13. The occupancy sensing system of claim 3, wherein the server is configured to transmit, to a personal electronic device communicatively coupled to the server, data indicating the most recent time at which a particular site of the plurality of sites was serviced by a custodial service worker.

14. The occupancy sensing system of claim 4, wherein the server is configured to transmit, to a personal electronic device communicatively coupled to the server, data indicating at the next time at which a particular site of the plurality of sites shall next be serviced by a custodial service worker.

15. The occupancy sensing system of claim 7, wherein the server is configured to transmit, to a personal electronic device communicatively coupled to the server, data indicating the estimated amount of remaining supplies at a particular site of the plurality of sites.

16. The occupancy sensing system of claim 11, wherein the server is configured to transmit, to a personal electronic device communicatively coupled to the server, data indicating the generated service schedule for at least one site of the plurality of sites.

17. The occupancy sensing system of claim 1, wherein each of the plurality of occupancy sensing devices includes a display configured to display a number of people occupying the respective site.

18. A method for determining occupancy of a site, the method comprising:
   receiving depth sensor data from at least one depth sensor that faces at least one entryway to a site;
   as each respective person enters and exits through the at least one entryway to the site, performing a multi-level scanning process to extract depth contours of a body of the respective person and determining a height, head radius, and shoulder size of the respective person based on the extracted depth contours;
   as each respective person enters and exits through the at least one entryway to the site, verifying that the extracted depth contours include a human head by comparing the extracted depth contours with an ellipsoid;
   as each respective person enters and exits through the at least one entryway to the site, verifying that the extracted depth contours include a human shoulder by discarding the extracted depth contours corresponding to the head and checking whether remaining extracted depth contours conform to a shoulder shape;
   determining an occupancy duration of each respective person who enters the site by matching an entry event of the respective person with an exit event of the respective person based on a comparison of the determined height, head radius, and shoulder size of the entry event and the exit event; and
   estimating, for each person who enters the site, a usage of supplies by the respective person at the site based on the occupancy duration of the respective person,
   wherein the site is a restroom and the supplies at the restroom include at least one of toilet paper, soap, and paper towels.

* * * * *